Dec. 26, 1967 R. A. RASMUSSEN 3,359,801
BATHYTHERMOGRAPH SYSTEM
Filed Sept. 15, 1964 2 Sheets-Sheet 1

Robert A. Rasmussen,
INVENTOR.

By Ervin F. Johnston
ATTORNEY.

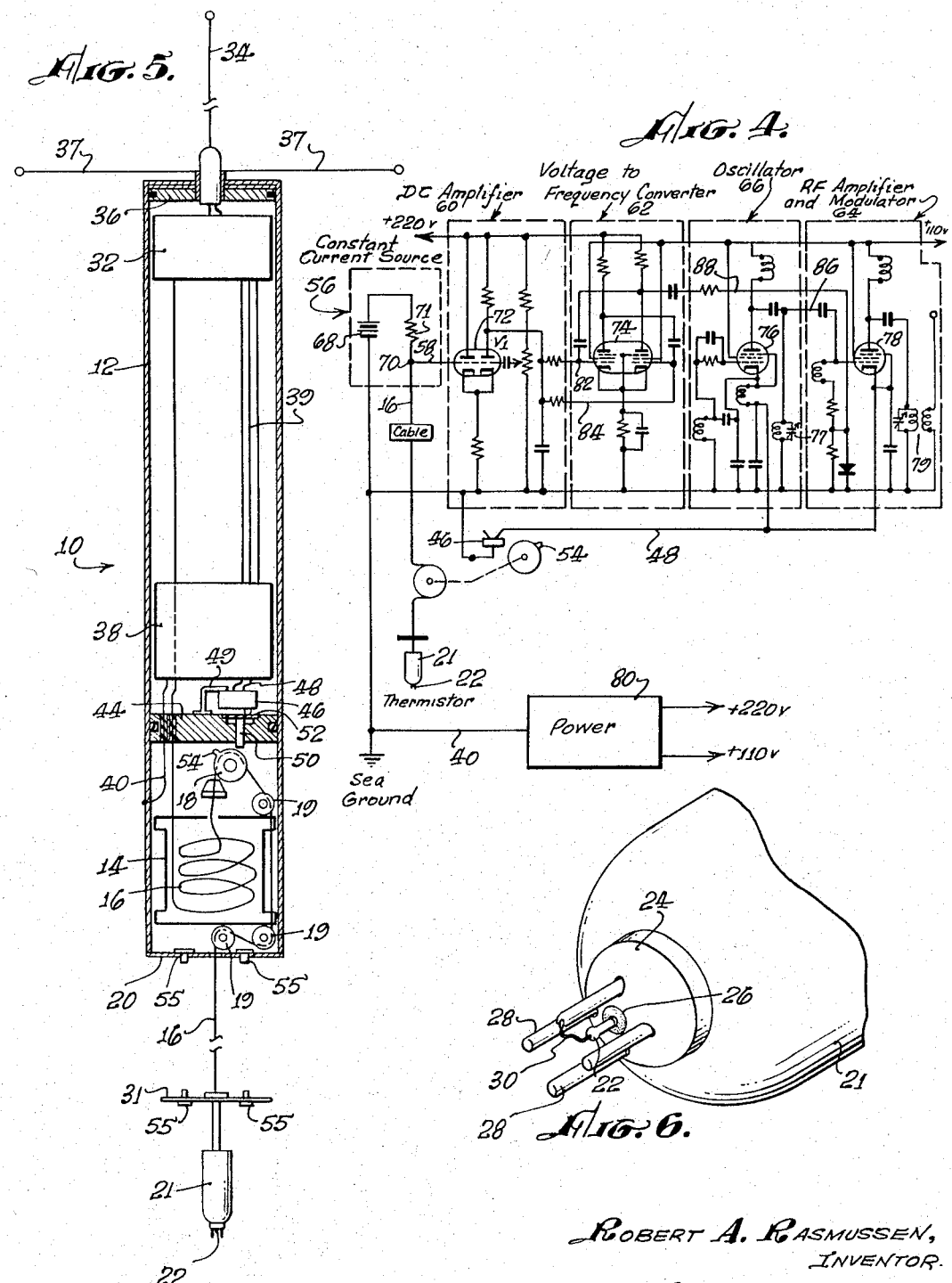

United States Patent Office 3,359,801
Patented Dec. 26, 1967

3,359,801
BATHYTHERMOGRAPH SYSTEM
Robert A. Rasmussen, San Diego, Calif., assignor, by mesne assignments, to the United States of America as represented by the Secretary of the Navy
Filed Sept. 15, 1964, Ser. No. 396,785
1 Claim. (Cl. 73—344)

The present invention relates to a bathythermograph system including a radio-telemetering buoy and a receiving and recording circuit and more particularly to a buoy which is capable of transmitting temperature versus depth indications to a receiving and recording circuit which is located at some remote station such as a ship or an aircraft.

Bathythermographs have been in use for many years by hydrographic ships and navies throughout the world for indicating the temperatures at various depths within the ocean. The standard type of bathythermograph used aboard ship is a temperature and pressure sensitive device which is paid out by a cable from the ship until it has reached the desired depth. It is then reeled back to the ship and a suitably coated glass is removed which presents a temperature versus depth curve. One problem with this type of bathythermograph is that the ship's speed must be reduced to not more than 15 knots while the bathythermograph is paid out. Further, any way of the ship causes the bathythermograph to take readings at different locations in the ocean so, if a reading is desired in a particular location, the ship would have to be stopped to take the reading.

To enable a ship to continue without reducing speed and to obtain temperatures at depths which extend essentially vertically downward it is highly desirable to have a flotatable buoy which can be dropped from the ship and which will telemeter the information to a shipboard receiving and recording network. The present invention has provided a bathythermograph system which accomplishes these results for ship use as well as aircraft use in a very unique manner.

The present system employs a free floating buoy from which a temperature sensing probe is paid out by a cable. Means are provided for accurately indicating the length of cable paid out and this information along with the temperature indications are transmitted to the ship or aircraft which released the buoy. A receiving and recording network may be located aboard the ship or aircraft for receiving the indications and separating them into respective channels for driving an X-Y type recorder.

The flotatable buoy employs a single conductor cable for paying out a temperature sensitive element. This has been accomplished by a sea ground circuit for the cable. Such a system reduces the weight of the buoy and keeps the cost low so that the buoy could be expended if the mission is better accomplished by not retrieving the buoy.

Accordingly, an object of the present invention is to provide a radio-telemetering buoy which is capable of transmitting accurate temperature versus depth indications.

Another object is to provide a radio-telemetering buoy which employs a single conductor cable for paying out a temperature sensitive element.

A further object is to provide a radio-telemetering buoy and a receiving-recording network wherein a minimum amount of circuitry is employed in the transmitting, receiving and recording operations.

Still a further object is to provide a bathythermograph system which is easy to construct, reliable in operation and will proudce positive depth indications.

Other objects and many of the attendant advantages of the present invention will become readily apparent by reference to the following detailed description and drawings wherein.

Figure 1:
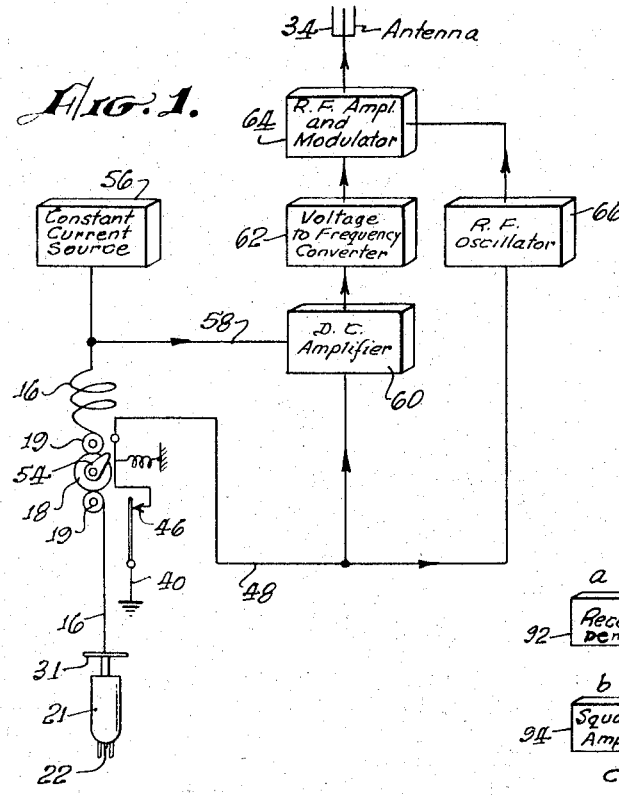
FIGURE 1 is a diagrammatic illustration of the circuitry and mechanical components of the radio-telemetering buoy.
Figure 2:
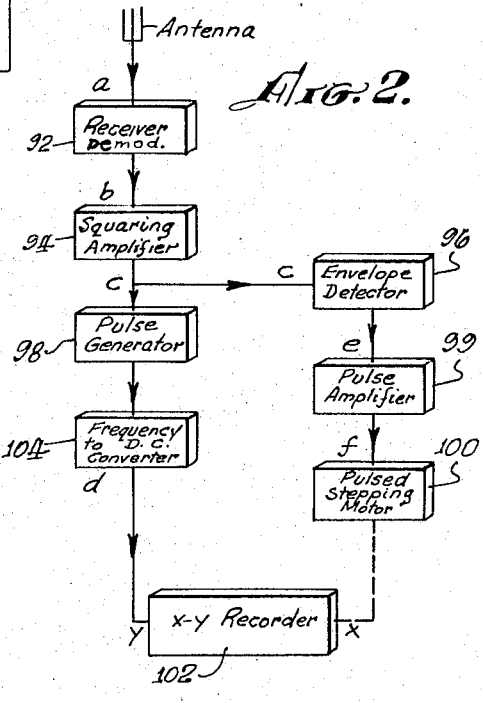
FIG. 2 is a diagrammatic illustration of the circuitry and X-Y recorder of the receiving-recorder network.

FIGS. 3a through f are illustrations of the wave shapes at the various stages a through f of the circuitry shown in FIG. 2;

FIG. 4 is primarily an illustration of the electronics components that may be utilized for the block diagram portion of FIG. 1;

FIG. 5 is a diagrammatic vertical section of the radio-telemetering buoy; and

FIG. 6 is an isometric view of the bottom end of the diving weight of the radio-telemetering buoy showing the thermistor assembly.

Referring now to the drawings wherein like reference numerals designate the same or similar parts throughout the several views there is shown in FIG. 5 a radio-telemetering buoy 10, the flotation thereof being accomplished by a hollow cylindrical container 12 which displaces enough water to float all of the components therein in an upright manner as shown in the figure.

The lower end of the container 12 has a cable reservoir 14 wherein a predetermined length of single conductor cable 16 is stored. One end of the cable extends upwardly through an opening in the cable reservoir and then over a sheave 18 and a series of pulleys 19 until it extends downwardly through an opening in a bottom plate 20 of the container. The sheave and each of the pulleys may be rotatably mounted in the container by a respective pin which extends at both ends into opposite walls of the container.

At the bottom end of the cable 16 is attached a diving weight 21. The weight 21 may have a longitudinally extending passage so that the cable may extend therethrough and be electrically connected to a thermistor 22 at the lower end of the weight 21. As shown in FIG. 6, the thermistor may be mounted to a plate 24 which in turn is attached to the bottom of the weight 21. If desired an epoxy seal 26 may be employed to mount the thermistor 22 to the plate 24 and the plate may be attached to the weight by welding.

Surrounding the thermistor are a series of guard pins 28 which may be force fitted into the plate 24 and may extend beyond the thermistor for protecting the thermistor. A lead 30 extending from the thermistor may be electrically connected to one of the guard pins for sea grounding one side of the thermistor, which grounding will be explained in more detail hereinafter. If desired a speed control disc 31 may be connected to an upper end of the weight 21 by an upwardly extending tube so that the descent of the weight and thermistor will not exceed a predetermined limit.

The other end of the cable 16 extends out of the reservoir 14, upwardly within the container 12 and is electrically connected to electronic components including transmission means which are located on a chassis 32, these components being described in detail hereinafter. These electronics components are connected to an antenna 34 which extends upwardly through a top sealing disc 36 within the container. If desired ground plane rods 37 may extend laterally from the antenna 34.

Located downwardly within the container 12 from the electronics chassis 32 is a chassis 38 for an AC power supply to the electronics components as well as a DC power supply to the thermistor 22. The AC power supply may be connected to the electronics components by a cable 39 and each of the power supplies may be sea grounded to the container 12 by a lead 40.

Below the power supply chassis 38 another sealing disc 44 is mounted within the cylinder 12. This sealing disc cooperates with the top sealing disc 36 to provide a watertight compartment for the electronics components and the power supplies. The cable 16 and the lead 40 may extend through the disc 44 and may be sealed therein by epoxy to ensure the watertight integrity.

In order to indicate the length of the cable 16 that is paid out from the reservoir 14 and consequently the depth of the thermistor 22 within the water a means is provided within the container which is actuated by the cable as it is paid out for quenching or interrupting the transmission means at constant interval lengths of the cable 16. This means may include a push button type single pole single throw switch 46 connected in one of the circuit lines 48 which supplies power to the transmission means. The switch 46 may be connected by a bracket 49 to the top side of the sealing disc 44 with the push button facing downwardly.

A plunger 50 may extend through the sealing disc 44 and may terminate below a rubber or other suitable membrane 52 which is sealed around its edges to the top of the sealing disc 44. When the plunger is pushed the membrane 52 will give and allow the plunger to actuate the switch 46. A bottom end of the plunger 50 may extend below the bottom end of the sealing disc 44 and may slidably engage the periphery of the sheave 18 to prevent the plunger from falling out of the disc 44.

The sheave 18 may be mounted below the sealing disc 44 and may have a cam 54 which extends radially beyond the periphery of the sheave so as to engage the bottom end of the plunger 50 and actuate the switch each time the sheave 18 makes a complete revolution. Accordingly, as the cable 16 passes over the sheave 18 the sheave rotates and the cam 54 momentarily actuates the switch 46 so as to interrupt the operation of the transmission means. Since the radius of that portion of the sheave that the cable 16 passes over will be known the amount of cable passing over the sheave for each transmission interruption will be known and this will indicate the depth of the thermistor 22 in the water. It is desirable to make the sheave of such a size that the frequency of the transmission interruptions differs from the frequency of the temperature signal by several octaves.

If desired the diving weight 21 may be retained to the container for a period of time so as to allow the radio telemetering buoy 10 to become stable in the water after its launch. This may be accomplished by a pair of soluble plugs 55, each of which before dissolving extends through the bottom container plate 20 and the control disc 31 and is flattened on appropriate sides thereof. In FIG. 5 the soluble plugs 55 are shown in their dissolved condition which means that the diving weight 21 has been released.

The thermistor 22 will sense the temperature of the water as it descends therein by its change in resistance and this change of resistance is sensed by the electronics components and transmitted as a signal along with the depth signals to a receiving station aboard a ship or aircraft. A general understanding of the circuitry for the radio-telemetering buoy can be attained by reference to FIG. 1.

As shown in FIG. 1 a constant current source 56 provides DC power through the cable 16 to the thermistor 22. Both the constant power source 56 and the thermistor are sea grounded so that the cable 16 may be a single conductor type. The single conductor principle keeps the weight and cost of the radio-telemetering buoy low. The pulleys 19 are shown out of place for the purpose of illustrating the components in a more convenient form.

As the resistance of the thermistor 22 changes with temperature change in the water this is reflected by a corresponding voltage change across the thermistor. This voltage change is picked up by a lead 58 which is connected at one end to the cable 16 and at the other end to a DC amplifier 60. The DC amplifier amplifies the temperature indicating voltage and feeds this amplified voltage to a voltage to frequency converter 62. The voltage to frequency converter 62 generates a frequency which is proportional to the amplified temperature indicating voltage and this frequency is fed to a radio frequency amplifier and modulator 64. The output of a radio frequency oscillator 66 is also fed to the R.F. amplifier and modulator 64 and this radio frequency is modulated therein by the temperature indicating frequency.

The oscillator circuit may be completed by the lead 48 which goes through the switch 46 and then to the sea ground through the lead 40. Accordingly, as the sheave 18 is rotated by the paying out of the cable 16 the cam 54 cyclically actuates the switch 46 and momentarily breaks the ground connection to the R.F. oscillator 66. This in turn momentarily breaks the power to the R.F. oscillator and thereby interrupts the generation of the R.F. signal. The number of these interruptions indicates the length of cable 16 paid out of the container 12 and accordingly the depth of the thermistor 22 in the water as it makes its temperature indications. A representation of the temperature modulated interrupted R.F. wave train transmitted is shown in $a$ of FIG. 3. A more detailed showing of the electronics components employed as well as the power supplies used for the radio-telemetering buoy 10 are shown in FIG. 4.

As shown in FIG. 4 the constant DC current source 56 to the thermistor may be a battery 68 which has one side sea grounded. Since the thermistor is also sea grounded a circuit is completed with the thermistor acting as a variable resistance which depends upon the water temperature. The change in resistance of the thermistor 22 will vary the voltage at point 70 which is located between a resistor 71 and the thermistor 22. The voltage at point 70 is picked up by the lead 58 and fed to the DC amplifier 60.

The DC amplifier 60 may include a twin triode 72, the voltage to frequency converter 62 may include two pentodes 74 which form a free-running multivibrator, the R.F. oscillator may include a pentode 76 and a tuned circuit 77 and the R.F. amplifier and modulator 64 may include a pentode 78 and antenna circuit 79. An AC power supply 80 is provided for the triode 72 and pentodes 74, 76 and 78. This power supply may include a DC to AC converter (not shown) with one side sea grounded via the lead 40 and the output may be +220 v. and +110 v.

In the operation of the circuit the thermistor voltage is applied via lead 58 to the twin triode 72 where the signal is amplified. The amplified signal is fed via leads 82 and 84 to the grids of the free-running multivibrator 74 where the signal is converted into a square wave which has a frequency variation, from the free-running mode of the multivibrator 74, which is proportional to the amplitude of the signal. The oscillator 66 generates a radio-frequency which is fed via a lead 86 to the amplifier pentode 78. The square wave output of the multivibrator pentodes 74 is also fed to the amplifier pentode 78 via a lead 88, the pentode causing the radio frequency thereat to be modulated by the square wave. The output of the amplifier pentode 78 is then fed to the antenna circuit 79.

Figure 3:
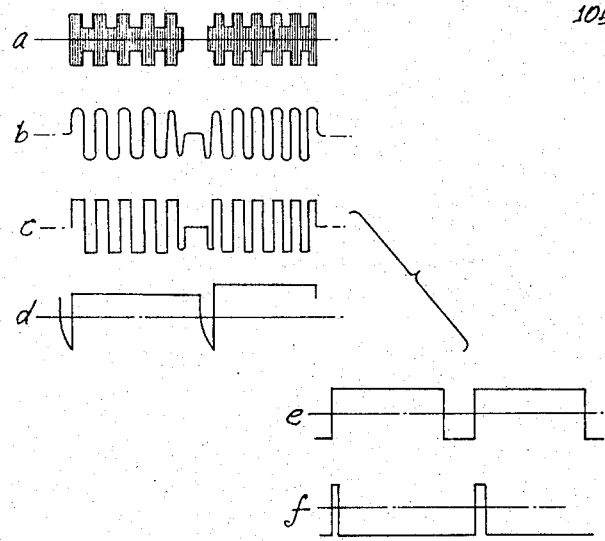

The cathodes of both pentodes 76 and 78 may be returned to sea ground through the switch 46. When the switch 46 opens momentarily once per revolution of the cam 54 the radio frequency signal is interrupted. Accordingly, the signal appearing at the antenna circuit is an interrupted modulated radio frequency which will be similar to the waveform $a$ of FIG. 3. The rate of interruption indicates the rate of descent of the thermistor 22 and the signal frequency will indicate the temperature of the water. In order to illustrate a change in water temperature waveform $a$ of FIG. 3 shows a higher frequency for that portion of the signal to the right of the interruption than for the portion to the left thereof.

The bathythermograph system may include a receiving and recording network which is capable of receiving the signal from the radio-telemetering buoy, processing the signal, and recording temperature versus depth readings on a recorder. The receiving network may be located remotely in a ship or an aircraft.

As shown in FIG. 2 the receiving network includes a receiver and demodulator 92 which picks up the signal transmitted by the radio-telemetering buoy. The output of the receiver and demodulator is a demodulated wave $b$ which is fed to a squaring amplifier 94 where the demodulated wave is converted to a square wave $c$. The square wave $c$ is fed to both an envelope detector 96 and a pulse generator 98.

The envelope detector 96 determines the envelope of the square wave $c$ between the interruptions and has an output waveform $e$ which is fed to a pulse amplifier 99. The pulse amplifier 99 strikes a sharp pulse at the leading edge of each enveloped waveform $e$ between the interruptions and this sharp pulse is used to drive a pulsed stepping motor 100. This pulsed stepping motor has its output shaft mechanically linked to the X mover of the stylus of an X–Y recorder 102. This pulsed movement will represent the depth of the thermistor 22 in the water.

As stated before the square wave $c$ is also fed to the pulse generator 98. If the amplitude of the square wave $c$ is not uniform the pulse generator converts the square wave $c$ to a similar square wave of uniform amplitude which in turn is fed to a frequency to DC converter 104. The frequency to DC converter 104 produces a DC voltage $d$ which is proportional to the frequency of the pulses. This voltage is used to drive a recorder motor which in turn moves the stylus of the recorder along the Y axis. This movement will indicate temperature and the combined X and Y movements of the stylus will indicate temperature versus depth of the water where the radio-telemetering buoy is located. It is to be understood that the recorder may be of other types such as where a roll of paper is moved along either the X or Y axis. The delivery of power to the components of the receiving and recording network has been omitted because the provision of such is well known by one skilled in the art.

It is now readily apparent that the present invention provides a bathythermograph system which enables the launching vehicle to obtain readings without altering course or speed. The radio-telemetering buoy is easy to construct, low in cost and reliable. The means employed for measuring the cable paid out of the buoy is precise since this means is actuated by the movement of the cable itself. Further a unique method is employed in the system for transmitting, receiving and recording the depth and temperature signals of the buoy. Accordingly, the present invention enables ships and aircraft to more easily obtain precise depth versus temperature conditions in the ocean.

Obviously, many modifications and variations of the present invention are possible in the light of the above teachings. It is therefore to be understood that within the scope of the appended claims the invention may be practiced otherwise than as specifically described.

I claim:

A bathythermograph system including a radio-telemetering buoy for telemetering depth and temperature indications of a body of water and a receiving and recording network for receiving and recording said indications comprising:

said radio telemetering buoy including:
 a container;
 temperature sensing circuit means, located within said container and including circuit line means payable therefrom downwardly into the water, for producing a voltage which is a function of the water temperature;
 means within said container coupled to said temperature sensing circuit means for receiving said voltage and producing a signal frequency variation which is proportional to the voltage;
 means within said container for transmitting said frequency;
 means within said container actuated by the circuit line means as it is paid out for interrupting the transmission of said frequency at constant interval lengths of the circuit line as it is paid out, whereby the transmission includes water temperature and depth indications; and the receiving and recording network including:
 means for receiving the interrupted signal transmitted by the radio telemetering buoy;
 means coupled to the receiving means for converting the receiving means signal frequency output between the interruptions to a square wave frequency;
 means coupled to the square wave converter for detecting the envelope of the square waves between the interruptions;
 means coupled to the envelope detector for producing a pulse at the leading edge of each envelope;
 a stepping motor coupeld to the pulse producing means and having an output shaft which is step rotated by each pulse received by the motor;
 an X–Y recorder connected to the motor shaft so that the X-axis of the recorder is progressively increased by each step rotation of the motor shaft;
 means coupled to the square wave converter for converting the square wave outputs between the interruptions to DC pulses which have amplitudes corresponding to the square wave frequencies; and
 said X–Y recorder being coupled to the DC converter so that the Y-axis of the recorder is driven according to the magnitude of the DC pulses.

References Cited

UNITED STATES PATENTS

| | | | |
|---|---|---|---|
| 2,963,682 | 12/1960 | Sasseen | 340—206 X |
| 2,978,690 | 4/1961 | Kurie et al. | 73—170 X |
| 3,098,993 | 7/1963 | Coop | 73—170 X |
| 3,221,556 | 12/1965 | Campbell et al. | |
| 3,273,393 | 9/1966 | Spark. | |

FOREIGN PATENTS 894,978   4/1962   Great Britain.

LOUIS R. PRINCE, *Primary Examiner.*

F. SHOON, *Assistant Examiner.*